(12) United States Patent
Okude et al.

(10) Patent No.: US 10,479,548 B2
(45) Date of Patent: Nov. 19, 2019

(54) PAPER INNER CONTAINER FOR HOLDING LIQUID REFILL CONTENTS

(71) Applicant: NIPPON PAPER INDUSTRIES CO., LTD, Tokyo (JP)

(72) Inventors: Hideki Okude, Tokyo (JP); Takaharu Noda, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/755,291

(22) PCT Filed: May 18, 2016

(86) PCT No.: PCT/JP2016/064703
§ 371 (c)(1),
(2) Date: Feb. 26, 2018

(87) PCT Pub. No.: WO2017/033509
PCT Pub. Date: Mar. 2, 2017

(65) Prior Publication Data
US 2018/0244426 A1    Aug. 30, 2018

(30) Foreign Application Priority Data
Aug. 25, 2015  (JP) .................................. 2015-166118

(51) Int. Cl.
*B65D 5/40* (2006.01)
*B65D 5/56* (2006.01)
(Continued)

(52) U.S. Cl.
CPC ................. *B65D 5/40* (2013.01); *B32B 1/02* (2013.01); *B32B 27/10* (2013.01); *B65D 5/067* (2013.01);
(Continued)

(58) Field of Classification Search
CPC .......... B65D 5/40; B65D 5/067; B65D 5/563; B65D 5/72; B65D 5/0227; B65D 5/064;
(Continued)

(56) References Cited

U.S. PATENT DOCUMENTS 2,469,535 A * 5/1949 Williamson ......... B65D 5/0227
229/137
2,652,186 A * 9/1953 Zinn, Jr. .............. B65D 5/0227
229/137
(Continued)

FOREIGN PATENT DOCUMENTS

| JP | 52-76500 | 6/1977 |
| JP | 5-81051 | 11/1993 |

(Continued)

OTHER PUBLICATIONS

International Search Report dated Aug. 16, 2016 in International Application No. PCT/JP2016/064703.

*Primary Examiner* — Christopher R Demeree
(74) *Attorney, Agent, or Firm* — Wenderoth, Lind & Ponack, L.L.P.

(57) ABSTRACT

A paper inner container for storage of refilling liquid content, which enables a suction port to be easily formed at a center of an upper surface thereof. The paper inner container includes: four body panels, which form a body having a square tubular shape; and a pair of upper-surface forming panels and a pair of side panels, which are continuously provided on upper edges of the body panels to form an upper surface. The pair of upper-surface forming panels face each other and overlap in a vertical direction. The pair of side panels are positioned between the pair of upper-surface forming panels to face each other and are folded up along with overlapping of the upper-surface forming panels. The pair of upper-surface forming panels have holes, which are
(Continued)

formed at centers of the upper-surface forming panels to serve as a suction port.

2 Claims, 8 Drawing Sheets (51) Int. Cl.
*B65D 5/06* (2006.01)
*B65D 5/72* (2006.01)
*B32B 1/02* (2006.01)
*B32B 27/10* (2006.01)
*B65D 5/74* (2006.01)
*B65D 77/04* (2006.01)

(52) U.S. Cl.
CPC ............... *B65D 5/563* (2013.01); *B65D 5/72* (2013.01); *B65D 5/74* (2013.01); *B65D 77/04* (2013.01); *B32B 2439/62* (2013.01)

(58) Field of Classification Search
CPC .......... B65D 5/0263; B65D 5/08; B65D 5/10; B32B 1/02; B32B 27/10
USPC .. 229/123.2, 137, 125.15, 184, 138, 125.42, 229/215; D9/431; 222/81; 220/626
See application file for complete search history.

(56) References Cited

U.S. PATENT DOCUMENTS

| 2,670,128 | A | * | 2/1954 | Stowitts | B65D 5/0227 229/132 |
| 4,003,467 | A | * | 1/1977 | Focke | B65D 5/0263 206/245 |
| 4,069,917 | A | * | 1/1978 | Stollberg | B65D 5/5011 206/423 |
| 4,102,486 | A | | 7/1978 | Focke et al. | |
| 4,209,092 | A | * | 6/1980 | Jones | A01G 9/026 206/423 |
| 4,355,758 | A | * | 10/1982 | Lavery | B65D 5/4204 206/777 |
| 5,350,110 | A | * | 9/1994 | Will | B65D 5/061 229/125.15 |
| 8,757,440 | B2 | * | 6/2014 | Ouillette | B65D 5/5033 222/105 |
| 2008/0272121 | A1 | | 11/2008 | Rosentreler | |

FOREIGN PATENT DOCUMENTS

| JP | 6-27654 | 4/1994 |
| JP | 10-147335 | 6/1998 |
| JP | 2009-520652 | 5/2009 |

* cited by examiner

PAPER INNER CONTAINER FOR HOLDING LIQUID REFILL CONTENTS

TECHNICAL FIELD

The present invention relates to a paper inner container for storage of a refilling liquid content, which is to be accommodated for use in a refillable container.

BACKGROUND ART

As a refillable container capable of being refilled with a liquid content, there has been known a refillable container including a container that is prepared as an inner container to store a refilling liquid content therein. The liquid content in the inner container is dispensed under a state in which the inner container is accommodated in the refillable container. When the liquid content in the inner container is used up, the inner container is taken out from the refillable container, and the inner container is replaced with a new inner container. In this manner, refilling is performed.

As the inner container to be used in such a refillable container, there have been known a container made of a synthetic resin (for example, see Patent Literature 1), and a bag-like container called a pouch (for example, see Patent Literature 2).

CITATION LIST

Patent Literature

[PTL 1] JP 2003-252338 A
[PTL 2] JP 2013-500907 A

SUMMARY OF INVENTION

Technical Problem

However, the inner container, which is used in the refillable container described in Patent Literatures 1 or 2 is made of a synthetic resin. Accordingly, a used inner container after replacement is categorized as industrial waste. Thus, there is a problem of laborious disposal of the inner container. It is conceivable that the inner container is made of paper in order to solve this problem. However, in this case, the following problem arises.

The refillable container includes a pump that is provided on a lid member and configured to pump up the liquid content in the inner container accommodated in a container main body, and to dispense the liquid content to an outside of the refill able container. When an opening of the container main body is closed by the lid member, in a case where a suction tube of the pump arranged below the lid member is to be inserted into a suction port formed in an upper surface of the inner container accommodated in the container main body, the pump on the lid member is provided at a center of the lid member view of easiness of operations. In order to cope with such a refillable container, the inner container is also required to have the suction port formed at a center of the upper surface thereof. As a paper container configured to store liquid, there have been known a gable-top-shaped paper container and a flat-top-shaped paper container. However, the suction port cannot be formed at a center of an upper surface of each of those paper containers because of the structure of an apex of each of those paper containers. When the paper container is used as the inner container configured to store liquid, there is a problem in that it is difficult to form the suction port at the center of the upper surface of the inner container.

It is an object of the present invention to provide a paper inner container for storage of a refilling liquid content, which enables that a suction port is easily formed at a center of an upper surface of the paper inner container.

It is another object of the present invention to provide a paper inner container for storage of a refilling liquid content, which is capable of reliably and thoroughly sucking out the liquid content.

Solution to Problem

In order to achieve the above-mentioned objects, according to the invention as described in claim 1, there is provided a paper inner container for storage of a refilling liquid content, which has a suction port that is formed in an upper surface thereof and allows insertion of a suction tube of a pump configured to pump up a liquid content and to dispense the liquid content to an outside of the paper inner container, the paper inner container being made of a paper material having a thermoplastic resin laminated on its both surfaces, and including: four body panels, which form a body having a square tubular shape by coupling an edge of one of the four body panels to a vertical direction sealing panel; and a pair of upper-surface forming panels and a pair of side panels, which are continuously provided on upper edges of the four body panels to form the upper surface of the paper inner container, in which the pair of upper-surface forming panels face each other and overlap in a vertical direction of the paper inner container, in which the pair of side panels are positioned between the pair of upper-surface forming panels to face each other and folded up along with overlapping of the pair of upper-surface forming panels, in which the pair of upper-surface forming panels have holes, which are formed at centers of the pair of upper-surface forming panels to serve as the suction port, in which one of the holes, which is formed in at least a lower upper-surface forming panel of the pair of upper-surface forming panels, is sealed by a tearable film, and in which a periphery of the lower upper-surface forming panel of the pair of upper-surface forming panels, an upper upper-surface forming panel of the pair of upper-surface forming panels, and the pair of side panels are bonded to each other to seal the paper inner container.

According to the invention as described in aspect 2 of the invention, in which the pair of gable roof-shaped bottom surface forming panels face each other, and have outer sealing panels, which have a belt-like shape, at lower portions thereof, in which the pair of gable wall-shaped bottom surface forming panels face each other, and have inner sealing panels, which have a belt-like shape and a height smaller than a height of the outer sealing panels, in which the pair of gable wall-shaped bottom surface forming panels are folded in between the pair of gable roof-shaped bottom surface forming panels, and facing surfaces of the outer sealing panels, which face each other, are bonded to each other to seal the paper inner container, and in which facing surfaces of the outer sealing panels and the inner sealing panels, and facing surfaces of the inner sealing panels are bonded to each other to seal the paper inner container.

Advantageous Effects of Invention

According to the paper inner container for refilling described in claim 1, the paper inner container is made of a paper material having a thermoplastic resin laminated on its both surfaces, and includes: the four body panels, which form the body having a square tubular shape by coupling the edge of one of the body panels to the vertical direction sealing panel; and the pair of upper-surface forming panels and the pair of side panels, which are continuously provided on the upper edges of the body panels to form the upper surface of the paper inner container, in which the pair of upper-surface forming panels face each other and overlap in the vertical direction, in which the pair of side panels are positioned between the pair of upper-surface forming panels to face each other and folded up along with overlapping of the pair of upper-surface forming panels, in which the pair of upper-surface forming panels have holes, which are formed at the centers of the pair of upper-surface forming panels to serve as the suction port, in which one of the holes, which is formed in at least the lower upper-surface forming panel of the pair of upper-surface forming panels, is sealed by the tearable film, and in which the periphery of the lower upper-surface forming panel of the pair of upper-surface forming panels, the upper upper-surface forming panel of the pair of upper-surface forming panels, and the pair of side panels are bonded to each other to seal the paper inner container. Thus, the suction port can be easily formed at the center of the upper surface of the paper inner container, and the liquid content can remain filled in the paper inner container.

When the paper inner container configured as described above is accommodated in the refillable container, the suction port formed in the upper surface of the paper inner container is positioned at a center of the opening of the container main body of the refillable container. Accordingly, with the configuration in which the pump is provided at a center of the lid member configured to close the opening of the container main body, irrespective of an orientation of the lid member configured to close the opening of the container main body, when the opening of the container main body is closed by the lid member, the suction tube arranged below the lid member is reliably inserted into the paper inner container from the suction port that is formed in the upper surface of the paper inner container. Thus, a replacing operation of the paper inner container, in which the liquid content is filled, can be performed easily.

According to the paper inner container for refilling described in aspect 2 of the invention, the pair of gable roof-shaped bottom surface forming panels and the pair of gable wall-shaped bottom surface forming panels, which are continuously provided on the lower edges of the four body panels to form the bottom surface of the paper inner container, in which the pair of gable roof-shaped bottom surface forming panels face each other, and have the outer sealing panels, which have a belt-like shape, at the lower portions thereof, in which the pair of gable wall-shaped bottom surface forming panels face each other, and have the inner sealing panels, which have a belt-like shape and a height smaller than the height of the outer sealing panels, in which the pair of gable wall-shaped bottom surface forming panels are folded in between the pair of gable roof-shaped bottom surface forming panels, and the facing surfaces of the outer sealing panels, which face each other, are bonded to each other to seal the paper inner container, and in which the facing surfaces of the outer sealing panels and the inner sealing panels, and the facing surfaces of the inner sealing panels are bonded to each other to seal the paper inner container. Thus, the bottom surface of the paper inner container is formed into a reversed quadrangular pyramid shape.

With this configuration, when the liquid content in the paper inner container is reduced to a small amount, the liquid content is accumulated at an apex of the reversed quadrangular pyramid shape in the bottom surface. When the opening of the container main body of the refillable container is closed by the lid member, and the suction tube arranged below the lad member is inserted into the paper inner container, a distal end of the suction tube is set to be positioned at the apex of the reversed quadrangular pyramid shape in the bottom surface of the paper inner container. Thus, the liquid content in the paper inner container can be reliably and thoroughly sucked out.

DESCRIPTION OF EMBODIMENTS

Now, one example of a paper inner container for refilling according to an embodiment of the present invention is described in detail with reference to the drawings.

Figure 1:
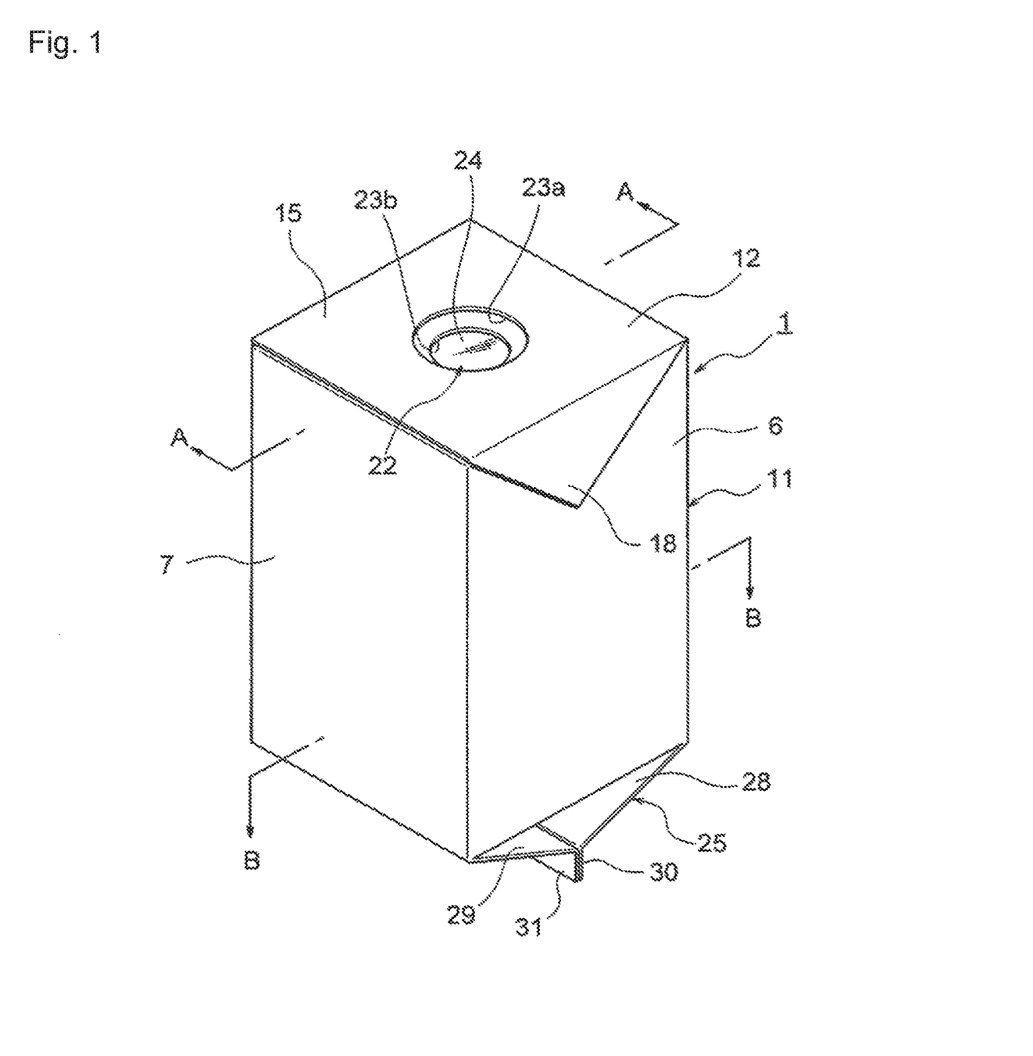
FIG. 1 is a perspective view for illustrating one example of a paper inner container for refilling according to an embodiment of the present invention.
Figure 2:
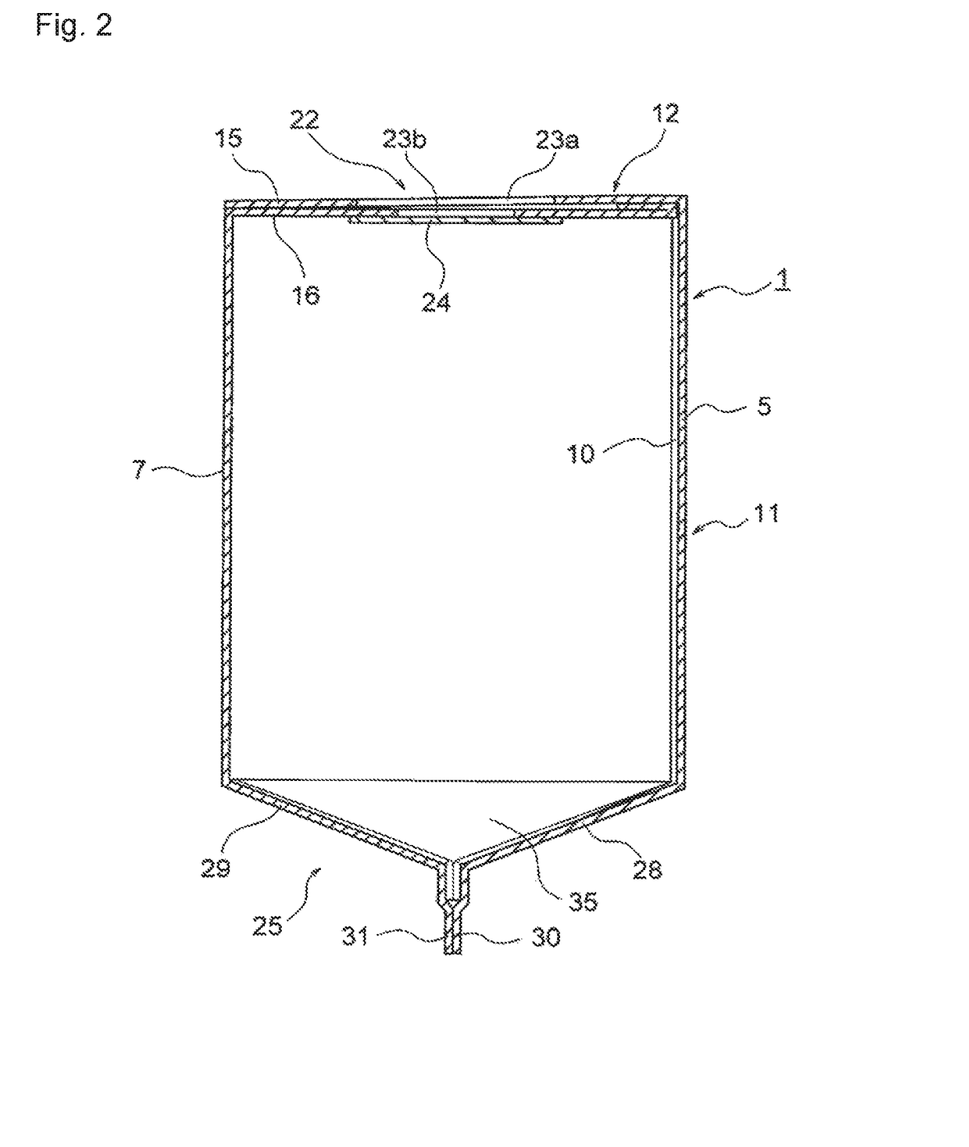
FIG. 2 is a sectional view taken along the line A-A of FIG. 1.
Figure 3:
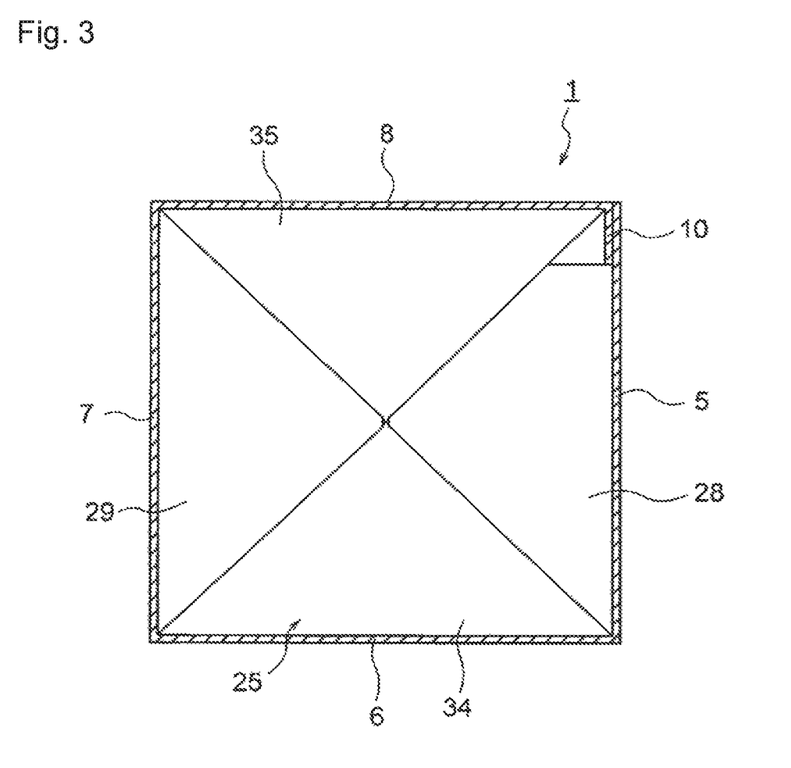
FIG. 3 is a sectional view taken along the line B-B of FIG. 1.
Figure 4:
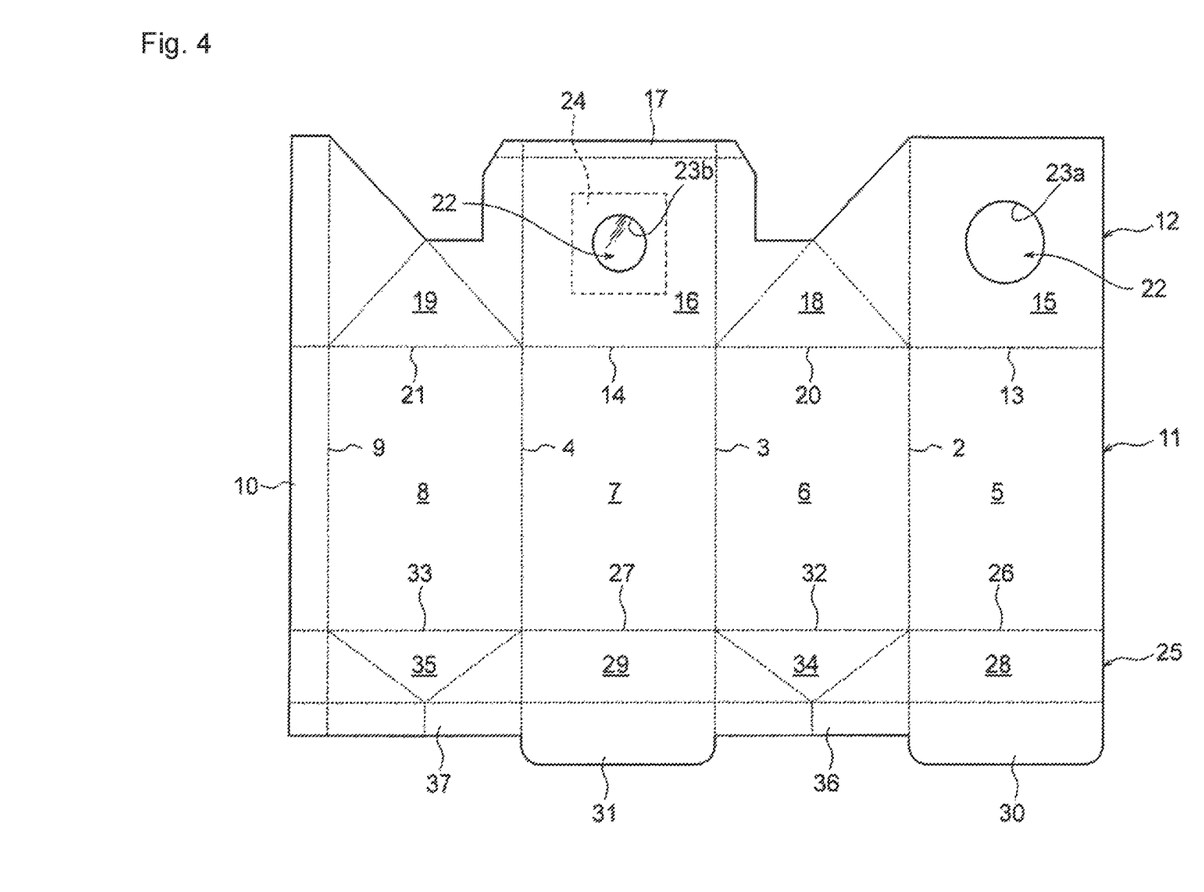
FIG. 4 is a developed view for illustrating a carton blank before being subjected to assembly processing of the paper inner container for refilling illustrated in FIG. 1.
Figure 5:
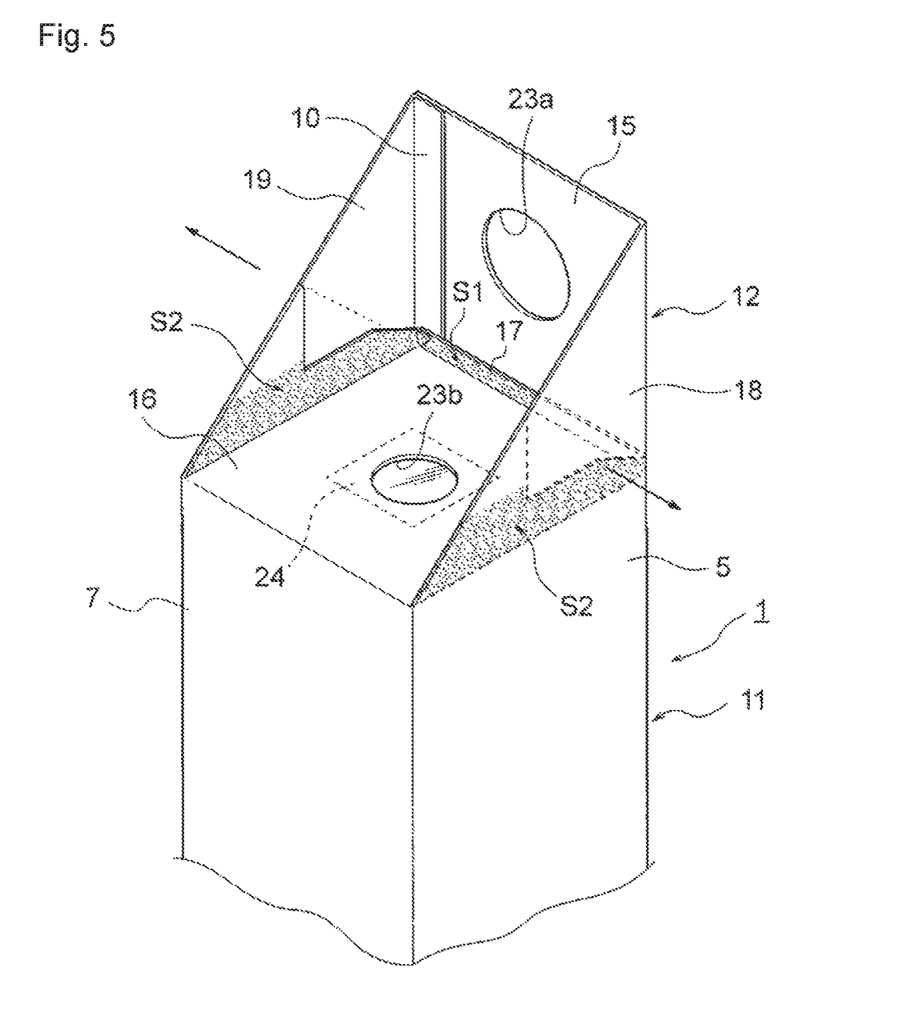
FIG. 5 is an explanatory view for illustrating a step of forming an upper surface of the paper inner container for refilling illustrated in FIG. 1.
Figure 6:
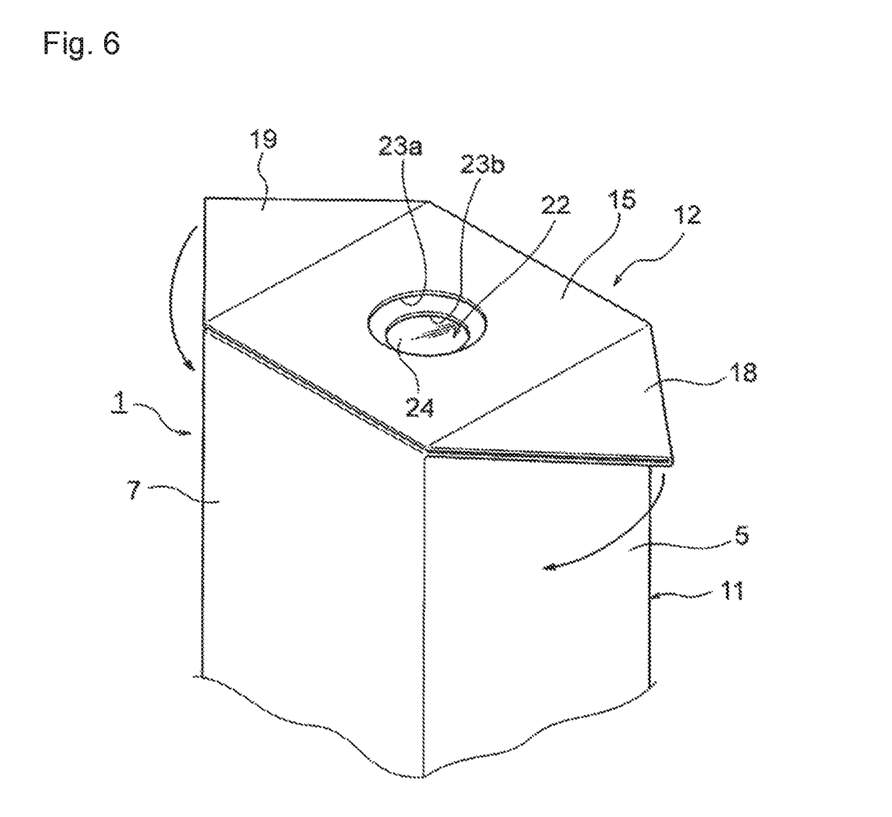
FIG. 6 is an explanatory view for illustrating a step of forming the upper surface of the paper inner container for refilling illustrated in FIG. 1.
Figure 7:
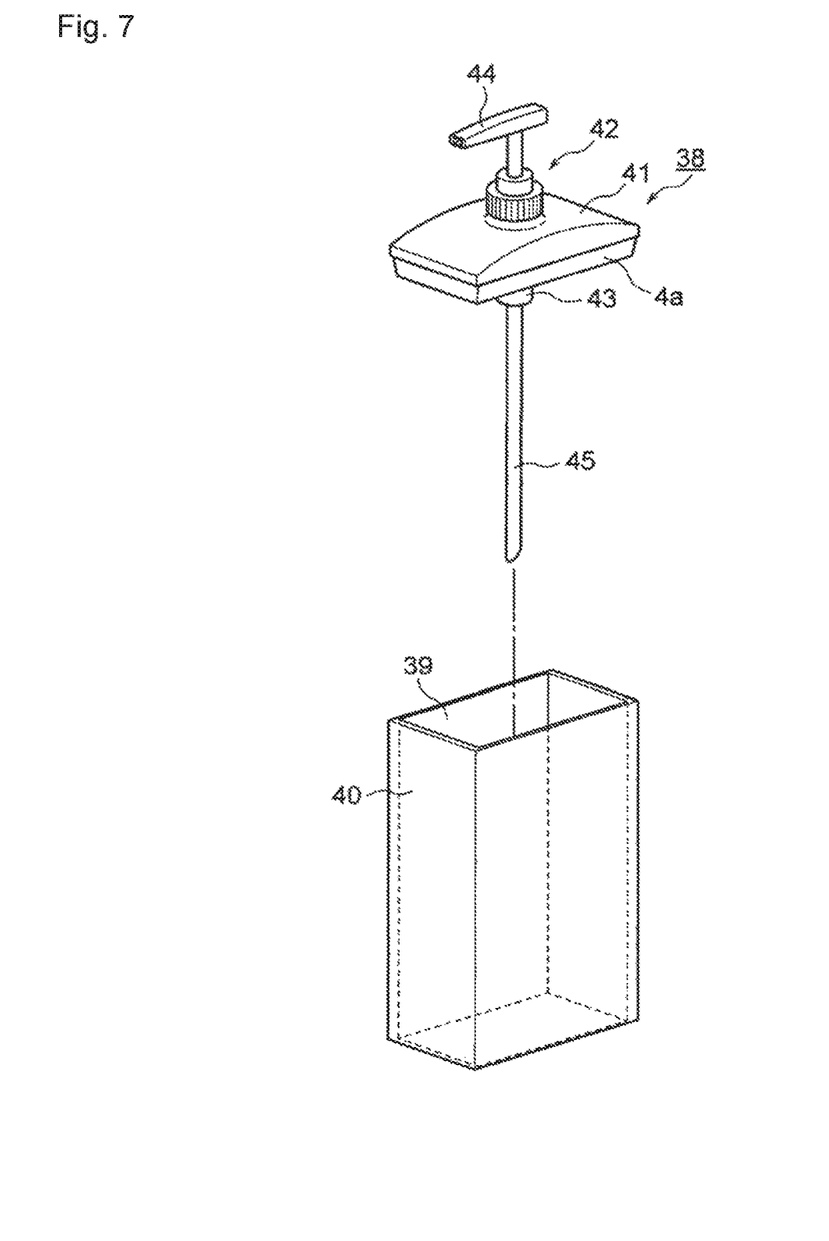
FIG. 7 is an exploded perspective view for illustrating one example of a refillable container that accommodates the paper inner container for refilling illustrated in FIG. 1.
Figure 8:
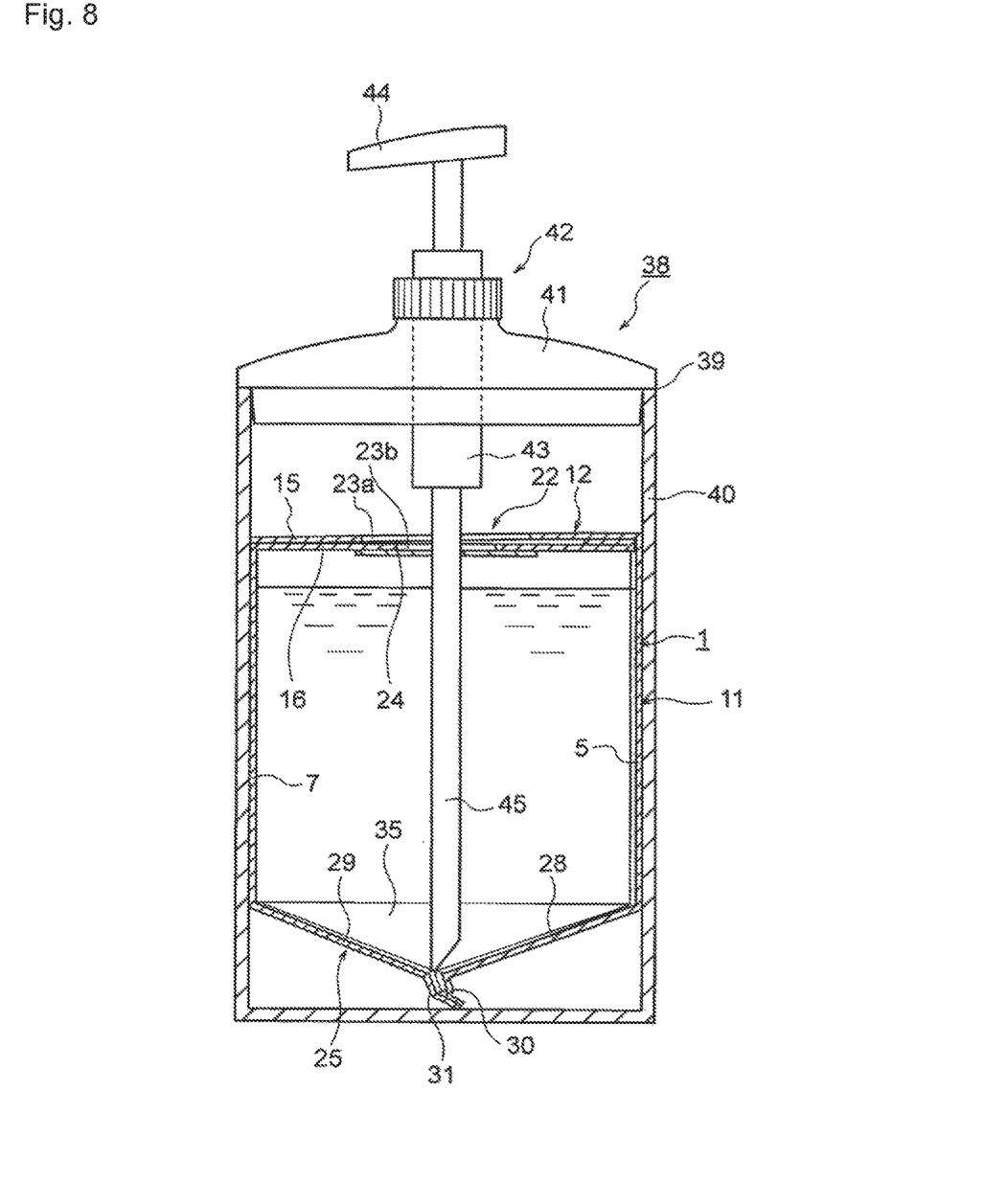
FIG. 8 is a vertical sectional explanatory view illustrating a state in which the paper inner container for refilling illustrated in FIG. 1 is accommodated in the refillable container illustrated in FIG. 7.

FIG. 1 is a perspective view for illustrating one example of the paper inner container for refilling according to the embodiment of the present invention. FIG. 2 is a sectional view taken along the line A-A of FIG. 1. FIG. 3 is a sectional view taken along the line B-B of FIG. 1. FIG. 4 is a developed view for illustrating a carton blank before being subjected to assembly processing of the paper inner container for refilling illustrated in FIG. 1. FIG. 5 is an explanatory view for illustrating a step of forming an upper surface of the paper inner container for refilling illustrated in FIG. 1. FIG. 6 is an explanatory view for illustrating a step of forming the upper surface of the paper inner container for refilling illustrated in FIG. 1. FIG. 7 is an exploded perspective view for illustrating one example of a refillable container that accommodates the paper inner container for refilling illustrated in FIG. 1. FIG. 8 is a vertical sectional explanatory view for illustrating a state in which the paper inner container for refilling illustrated in FIG. 1 is accommodated in the refillable container illustrated in FIG. 7.

A paper inner container 1 for refilling of this example is of a paper material having a thermoplastic resin laminated on its both surfaces, and includes four body panels 5, 6, 7, and 8 through vertical folding lines 2, 3, and 4 of the body.

The four body panels 5, 6, 7, and 8 form a body having a square tubular shape by coupling an edge of the body panel 5 to a vertical direction sealing panel 10, which is continuously provided on the body panel 8 through a vertical folding line 9 of the seal.

In this example, the upper surface 12 of the paper inner container 1 is configured as described below.

A pair of upper-surface forming panels 15 and 16, which face each other and overlap in the vertical direction, are continuously provided on upper edges of the body panels 5 and 7 through horizontal folding lines 13 and 14 of a top. Further, a sealing panel 17 for sealing an inner surface of the upper-surface forming panel 15 is continuously provided on an upper edge of the upper-surface forming panel 16, which underlies the upper-surface forming panel 15.

Further, a pair of side panels 18 and 19 are continuously provided on upper edges of the body panels 6 and 8 through horizontal folding lines 20 and 21 of the top. The pair of side panels 18 and 19 are positioned between the above-mentioned pair of upper-surface forming panels 15 and 16 to face each other and folded up along with overlapping of the pair of upper-surface forming panels 15 and 16.

Further, holes 23a and 23b are formed at centers of the upper-surface forming panels 15 and 16, respectively, to serve as a suction port 22. The holes 23a and 23b are opened so that a center of the hole 23a and a center of the hole 23b match with each other when the upper-surface forming panels 15 and 16 overlap. Further, a film 24, which is tearable, is provided on a back surface of the upper-surface forming panel 16 so as to seal the hole 23b. A suction tube 45 of a pump 42 described later is stuck into the film 24 so as to tear the film 24.

In this example, the film 24 configured to seal the hole 23b is provided on the back surface of the upper-surface forming panel 16, but the film 24 is not limited thereto. The film 24 may be provided on a front surface of the upper-surface forming panel 16, and may be provided on each of the front and back surfaces of the upper-surface forming panel 16.

A known film, such as polyethylene, polypropylene, polyester, or cellophane may be used as the film 24, but film 24 is not particularly limited thereto. When the film 24 is a thermoplastic resin, the hole 23b formed in the upper-surface forming panel 16 can be easily sealed by heat sealing.

In addition, aluminum foil, paper, or the like may be laminated on the film 24 in order to improve tearability, light-blocking property, oxygen barrier property, or the like.

The upper surface 12 of the paper inner container 1 is formed by the upper-surface forming panels 15 and 16 and the side panels 18 and 19 as described below. After the body 11 is formed, first, the upper-surface forming panel 16 is folded inwardly. Along with that, the side panels 18 and 19 are folded up to inner surface sides into a triangular shape, and an upper opening of the body 11 is closed by the upper-surface forming panel 16. Then, the sealing panel 17, which is continuously provided on the upper edge of the upper-surface forming panel 16, is bonded to the inner surface of the upper-surface forming panel 15 in an area of S1 so as to seal the paper inner container 1. Both side edges of the upper-surface forming panel 16 are bonded to the side panels 18 and 19, which have been folded up into a triangular shape, in an area of S2 so as to seal the paper inner container 1 (see FIG. 5).

Next, the side panels 18 and 19 are folded up outwardly (in directions indicated by the arrows in FIG. 5) so that the upper-surface forming panel 15 overlies the upper-surface forming panel 16 (see FIG. 6). The side panels 18 and 19, which have been folded up to protrude to an outside of the body 11, are folded downwardly (in directions indicated by the arrows in FIG. 6), and fixed to the body 11 with an adhesive or the like. Accordingly, the upper surface 12 is formed.

Further, in this example, the bottom surface 25 of the paper inner container 1 is configured as described below.

A pair of gable roof-shaped bottom surface forming panels 28 and 29, which face each other, are continuously provided on lower edges of the body panels 5 and 7 through horizontal folding lines 26 and 27 of the bottom. Outer sealing panels 30 and 31, which have a belt-like shape, are continuously provided on lower parts of the gable roof-shaped bottom surface forming panels 28 and 29.

Further, a pair of gable wall-shaped bottom surface forming panels 34 and 35, which face each other, are continuously provided on lower edges of the body panels 6 and 8 through horizontal folding lines 32 and 33 of the bottom. Inner sealing panels 36 and 37, which have a belt-like shape and a height smaller than that of the outer sealing panels 30 and 31, are continuously provided on lower parts of the gable wall-shaped bottom surface forming panels 34 and 35.

Further, the bottom surface 25 is formed by the gable roof-shaped bottom surface forming panels 28 and 29 and the gable wall-shaped bottom surface forming panels 34 and 35 as described below. The gable wall-shaped bottom surface forming panels 34 and 35 are folded in between the gable roof-shaped bottom surface forming panels 28 and 29, and facing surfaces of the outer sealing panels 30 and 31, which face each other, are bonded to each other to seal the paper inner container 1. Further, facing surfaces of the outer sealing panels 30 and 31 and facing surfaces of the inner sealing panels 36 and 37, and facing surfaces of the inner sealing panels 36 and 37 are bonded to each other to seal the paper inner container 1. Accordingly, the bottom surface 25 is formed into a reversed quadrangular pyramid shape of a so-called reversed gable top shape (see FIG. 2 and FIG. 3).

According to the paper inner container 1 configured as described above, as for the upper surface 12, the pair of upper-surface forming panels 15 and 16 and the pair of side panels 18 and 19 are continuously provided on the upper edges of the body panels 5, 6, 7, and 8. The pair of upper-surface forming panels 15 and 16 face each other and overlap in the vertical direction. The pair of side panels 18 and 19 are positioned between the upper-surface forming panels 15 and 16 to face each other and folded up along with the overlapping of the upper-surface forming panels 15 and 16. The holes 23a and 23b are formed at the centers of the upper-surface forming panels 15 and 16 to serve as the suction port 22. A periphery of the lower upper-surface forming panel 16, the upper upper-surface forming panel 15, and the side panels 18 and 19 are bonded to each other to seal the paper inner container 1. Thus, the suction port 22 can easily be formed at the center of the upper surface 12 of the paper inner container 1.

Further, in the bottom surface 25, the pair of gable roof-shaped bottom surface forming panels 28 and 29, which face each other, are continuously provided on the lower edges of the body panels 5 and 7. The pair of gable roof-shaped bottom surface forming panels 28 and 29 have the outer sealing panels 30 and 31 provided on their lower parts. The pair of gable wall-shaped bottom surface forming panels 34 and 35, which face each other, are continuously provided on the lower edges of the body panels 6 and 8. The pair of gable wall-shaped bottom surface forming panels 34 and 35 have the inner sealing panels 36 and 37, which have a height smaller than that of the outer sealing panels 30 and 31. The gable wall-shaped bottom surface forming panels 34 and 35 are folded in between the gable roof-shaped bottom surface forming panels 28 and 29. The facing surfaces of the outer sealing panels 30 and 31 are bonded to each other to seal the paper inner container 1. Further, the facing surfaces of the outer sealing panels 30 and 31 and the facing surfaces of the inner sealing panels 36 and 37, and the facing surfaces of the inner sealing panels 36 and 37 are also bonded to each other to seal the paper inner container 1. Thus, the bottom surface 25 having the reversed quadrangular pyramid shape can easily be formed FIG. 7 is an illustration of one example of a refillable container that accommodates the paper inner container 1 configured as described above. A refillable container 38 of this example includes: a container main body 40, which has an opening 39 in an upper part thereof and is made of plastic; a lid member 41, which is configured to close the opening 39 of the container main body 40 and is made of plastic; and a pump 42, which is provided on the lid member 41 and configured to pump up the liquid content in the paper inner container 1 accommodated in the container main body 40 and to dispense the liquid content to an outside of the refillable container.

The pump 42 includes: a tubular cylinder portion 43; a dispense nozzle 44, which is provided on an upper part of the tubular cylinder portion 43 and serves also as an operation portion for a piston that is slidably fitted into the tubular cylinder portion 43; and a suction tube 45, which is provided on a lower part of the tubular cylinder portion 43. The pump 12 is provided at a center of the lid member 41. The tubular cylinder portion 43 penetrates a center portion of the lid member 41, and is fixed to the center portion of the lid member 41. The dispense nozzle 44 is arranged above the lid member 41, and the suction tube 45 is arranged below the lid member 41.

When the opening 39 of the container main body 40 is closed by the lid member 41, the suction tube 45 arranged below the lid member 41 is inserted into the paper inner container 1 from the suction port 22 that is formed in the upper surface 12 of the paper inner container 1.

When the paper inner container 1 according to the present invention is accommodated in the container main body 40 of the refillable container 38 configured as described above, the suction port 22 formed in the upper surface 12 of the paper inner container 1 is positioned at a center of the opening 39 of the container main body 40 of the refillable container 38. Accordingly, irrespective of an orientation of the lid member 41 configured to close the opening 39 of the container main body 40, when the opening 39 of the container main body 40 is closed by the lid member 41, the suction tube 45 arranged below the lid member 41 is reliably inserted into the paper inner container 1 from the suction port 22 that is formed in the upper surface 12 of the paper inner container 1. Thus, a replacing operation of the paper inner container 1, in which the liquid content is filled, can be performed easily.

Further, the bottom surface 25 of the paper inner container 1 is formed into the reversed quadrangular pyramid shape. Accordingly, when the liquid content in the paper inner container is reduced to a small amount, the liquid content is accumulated at an apex of the reversed quadrangular pyramid shape in the bottom surface 25. When the opening 39 of the container main body 40 of the refillable container 38 is closed by the lid member 41, and the suction tube 45 arranged below the lid member 41 is inserted into the paper inner container 1, a distal end of the suction tube 45 is set to be positioned at the apex of the reversed quadrangular pyramid shape in the bottom surface 25 of the paper inner container 1 (see FIG. 8). Thus, the liquid content in the paper inner container 1 can be reliably and thoroughly sucked out.

REFERENCE SIGNS LIST 1 paper inner container
2, 3, 4 vertical folding line of body
5, 6, 7, 8 body panel
9 vertical folding line of seal
10 vertical direction sealing panel
11 body
12 upper surface
13, 14 horizontal folding line of top
15, 16 upper-surface forming panel
17 sealing panel
18, 19 side panel
20, 21 horizontal folding line of top
22 suction port
23a, 23b hole
24 film
25 bottom surface
26, 27 horizontal folding line of bottom
28, 29 gable roof-shaped bottom surface forming panel
30, 31 outer sealing panel
32, 33 horizontal folding line of bottom
34, 35 gable wall-shaped bottom surface forming panel
36, 37 inner sealing panel
38 refillable container
39 opening
40 container main body
41 lid member
42 pump
43 tubular cylinder portion
44 dispense nozzle
45 suction tube

The invention claimed is:

1. A paper inner container for storage of a refilling liquid content, which has a suction port that is formed in an upper surface thereof and allows insertion of a suction tube of a pump configured to pump up a liquid content and to dispense the liquid content to an outside of the paper inner container,
the paper inner container being made of a paper material having a thermoplastic resin laminated on both of its surfaces, and comprising:
four body panels, which form a body having a square tubular shape by coupling an edge of one of the four body panels to a vertical direction sealing panel; and
a pair of upper-surface forming panels and a pair of side panels, which are continuously provided on upper edges of the four body panels to form the upper surface of the paper inner container,
wherein the pair of upper-surface forming panels face each other and overlap in a vertical direction of the paper inner container,
wherein the pair of side panels are positioned between the pair of upper-surface forming panels to face each other and are folded up outwardly from the pair of upper-surface forming panels while also overlapping the pair of upper-surface forming panels,
wherein the pair of upper-surface forming panels have holes, which are formed at centers of the pair of upper-surface forming panels to serve as the suction port,
wherein one of the holes, which is formed in at least a lower upper-surface forming panel of the pair of upper-surface forming panels, is sealed by a tearable film, and wherein a periphery of the lower upper-surface forming panel of the pair of upper-surface forming panels, an upper upper-surface forming panel of the pair of upper-surface forming panels, and the pair of side panels are bonded to each other to seal the paper inner container.

2. A paper inner container for storage of a refilling liquid content according to claim 1, wherein a pair of gable roof-shaped bottom surface forming panels face each other, and have outer sealing panels, which have a belt-like shape, at lower portions thereof, wherein a pair of gable wall-shaped bottom surface forming panels face each other, and have inner sealing panels, which have a belt-like shape and a height smaller than a height of the outer sealing panels, wherein the pair of gable wall-shaped bottom surface forming panels are folded in between the pair of gable roof-shaped bottom surface forming panels, and facing surfaces of the outer sealing panels, which face each other, are bonded to each other to seal the paper inner container, and wherein facing surfaces of the outer sealing panels and the inner sealing panels, and facing surfaces of the inner sealing panels are bonded to each other to seal the paper inner container.

\* \* \* \* \*